US009452766B2

(12) United States Patent
Hsieh

(10) Patent No.: US 9,452,766 B2
(45) Date of Patent: Sep. 27, 2016

(54) GOODS FIXING STRUCTURE FOR A TROLLEY

(71) Applicant: Hando Industrial Co., Ltd., Yuanlin Township, Chang Hua County (TW)

(72) Inventor: Hung-Hsin Hsieh, Yuanlin Township (TW)

(73) Assignee: Hando Industrial Co., Ltd., Yuanlin Township (TW)

( * ) Notice: Subject to any disclaimer, the term of this patent is extended or adjusted under 35 U.S.C. 154(b) by 0 days.

(21) Appl. No.: 14/732,866

(22) Filed: Jun. 8, 2015

(65) Prior Publication Data

US 2016/0068174 A1    Mar. 10, 2016

(30) Foreign Application Priority Data

Sep. 4, 2014    (TW) .............................. 103215837 U

(51) Int. Cl.
| B62B 1/06 | (2006.01) |
| B62B 1/04 | (2006.01) |
| B62B 1/14 | (2006.01) |
| B62B 1/26 | (2006.01) |
| B62B 1/12 | (2006.01) |

(52) U.S. Cl.
CPC . *B62B 1/06* (2013.01); *B62B 1/04* (2013.01); *B62B 1/14* (2013.01); *B62B 1/264* (2013.01); *B62B 1/12* (2013.01); *B62B 2202/02* (2013.01)

(58) Field of Classification Search
CPC .......... B62B 2203/40; B62B 2203/42; B62B 2203/44; B62B 2202/20; B62B 2202/02; B62B 2202/026; B62B 2202/028; B62B 1/04; B62B 1/06; B62B 1/204; B62B 1/142; B62B 1/14; B62B 1/144; B62B 1/12; B62B 1/264; B62B 3/104
See application file for complete search history.

(56) References Cited

U.S. PATENT DOCUMENTS

| 2,077,349 | A | * | 4/1937 | Hobbis | ................... | B62B 1/264 |
| | | | | | | 280/47.23 |
| 2,584,918 | A | * | 2/1952 | Salsas | ..................... | B62B 1/264 |
| | | | | | | 414/445 |
| 4,084,706 | A | * | 4/1978 | Russell | .................. | B62B 3/104 |
| | | | | | | 212/901 |
| 4,448,434 | A | * | 5/1984 | Anderson | ................ | B62B 1/12 |
| | | | | | | 224/915 |
| 5,344,278 | A | * | 9/1994 | Emig, Jr. | .................. | B62B 3/04 |
| | | | | | | 294/119.2 |
| 5,791,855 | A | * | 8/1998 | Dixon | ..................... | B62B 1/142 |
| | | | | | | 414/445 |
| 6,530,584 | B1 | * | 3/2003 | Lucy | ....................... | B62B 1/142 |
| | | | | | | 280/47.29 |
| 6,918,604 | B2 | * | 7/2005 | Liao | ....................... | A63B 55/60 |
| | | | | | | 280/47.24 |
| 7,350,791 | B2 | * | 4/2008 | Wu | .......................... | B62B 3/04 |
| | | | | | | 280/47.26 |
| 7,367,571 | B1 | * | 5/2008 | Nichols | .................... | B25H 1/12 |
| | | | | | | 280/47.131 |
| 7,438,300 | B1 | * | 10/2008 | Zien | .......................... | B62B 1/14 |
| | | | | | | 280/47.26 |
| 7,740,251 | B2 | * | 6/2010 | Simmons | ................ | B62B 1/264 |
| | | | | | | 280/43.11 |
| 2002/0168259 | A1 | * | 11/2002 | McConnell | ............. | B62B 1/142 |
| | | | | | | 414/490 |

(Continued)

*Primary Examiner* — Emma K Frick

(74) *Attorney, Agent, or Firm* — Alan D. Kamrath; Kamrath IP Lawfirm, P.A.

(57) ABSTRACT

A goods fixing structure for a trolley contains: two support columns, a connection mount, and at least two retainers. A control bar is disposed between two top ends of the two support columns, and the connection mount is mounted between two bottom ends of the two support columns and includes two locking recesses defined on one side thereof. Each retainer has an abutting face and two contacting faces. Each contacting face has an engaging rib arranged thereon to retain with each of the two locking recesses. Thereby, the at least two retainers are connected with the connection mount of the trolley, and each retainer has the abutting face. Thus, the at least two retainers position columnar or cylindrical goods stably when pushing the trolley, thus avoiding the goods dropping from the trolley.

7 Claims, 6 Drawing Sheets

(56) References Cited

U.S. PATENT DOCUMENTS

| | | | |
|---|---|---|---|
| 2004/0245735 A1* | 12/2004 | Pins | B62B 1/142 280/79.5 |
| 2005/0129491 A1* | 6/2005 | Smith | B62B 1/142 414/490 |
| 2010/0021275 A1* | 1/2010 | Ratermann | B62B 1/14 414/454 |
| 2016/0031463 A1* | 2/2016 | Weaver | B62B 1/264 280/659 |

* cited by examiner

GOODS FIXING STRUCTURE FOR A TROLLEY

BACKGROUND OF THE INVENTION

1. Field of the Invention

The present invention relates to a trolley and, more particularly, to a goods fixing structure for the trolley.

2. Description of the Prior Art

A conventional trolley contains a support frame, at least one roller disposed on two sides of a bottom end of the support frame, and a holding plate mounted on the bottom end of the support frame to hold goods. An angle between the holding plate and the support frame is 90 degrees. The goods are placed on the holding plate and contact with the support frame, so that the trolley is pushed to move by using its at least one roller. However, the goods cannot be fixed by a fixing structure of the trolley while moving the trolley. For example, when carrying cylindrical goods by using the trolley, the cylindrical goods vibrate or drop from the trolley easily.

The present invention has arisen to mitigate and/or obviate the afore-described disadvantages.

SUMMARY OF THE INVENTION

The primary objective of the present invention is to provide a goods fixing structure for a trolley in which two retainers are connected with a connection mount of the trolley, and each retainer has an abutting face. The two retainers position columnar or cylindrical goods stably while pushing the trolley, thus avoiding the goods dropping from the trolley.

Another objective of the present invention is to provide a goods fixing structure for a trolley in which each retainer has two contacting faces, and lengths of the two connecting faces are different. The two retainers are connected with the trolley by using the two contacting faces of each retainer to change a distance between the two retainers. Hence, goods of different sizes are carried by the trolley easily.

To obtain the above-mentioned objectives, a goods fixing structure for a trolley provided by the present invention contains: two support columns, a connection mount, and at least two retainers.

A control bar is disposed between two top ends of the two support columns, and the connection mount is mounted between two bottom ends of the two support columns and includes two locking recesses defined on one side thereof.

Each retainer has an abutting face and two contacting faces. Each contacting face has an engaging rib arranged thereon to retain with one of the two locking recesses.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
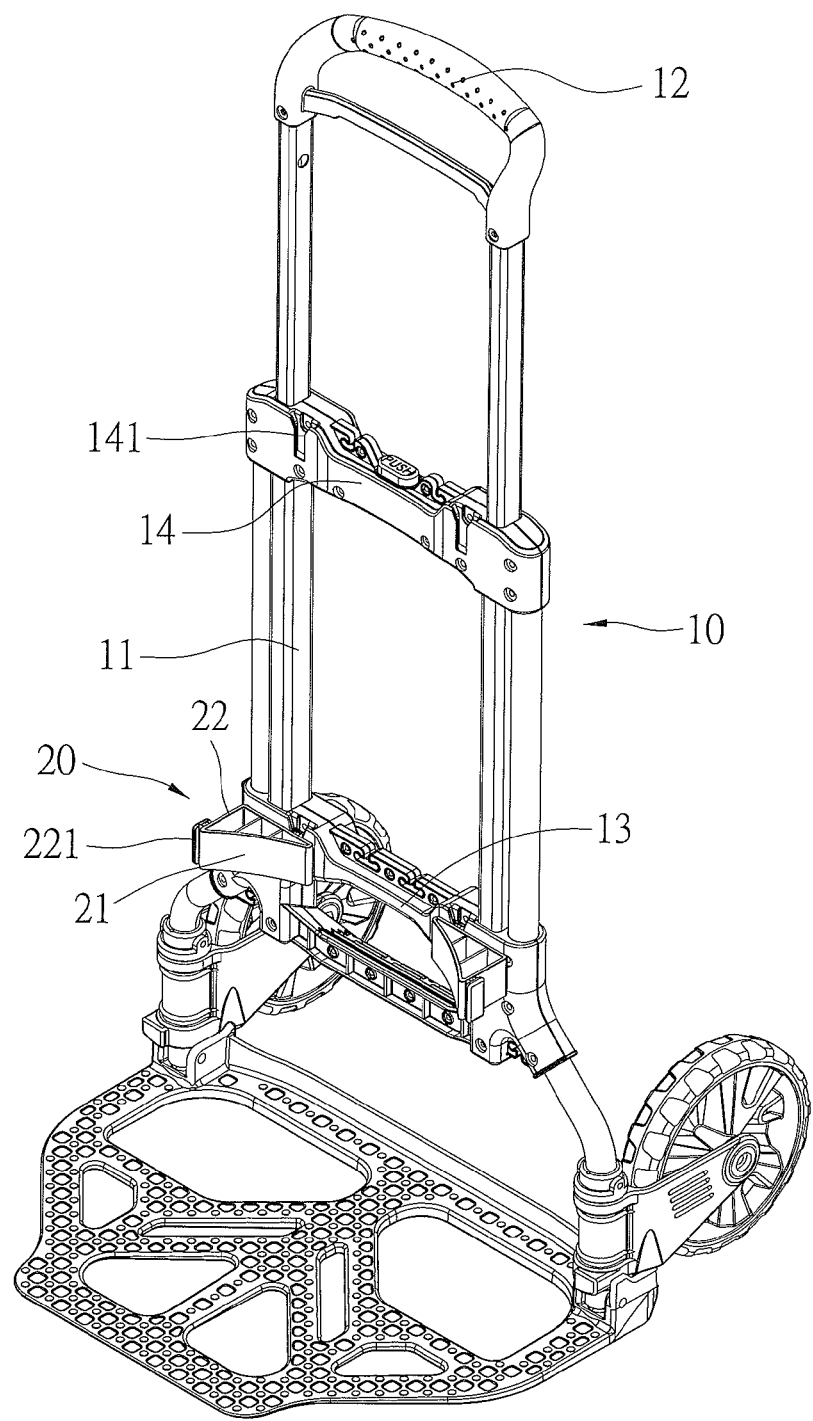
FIG. 1 is a perspective view showing the assembly of a goods fixing structure for a trolley in accordance with a preferred embodiment of the present invention.
Figure 2:
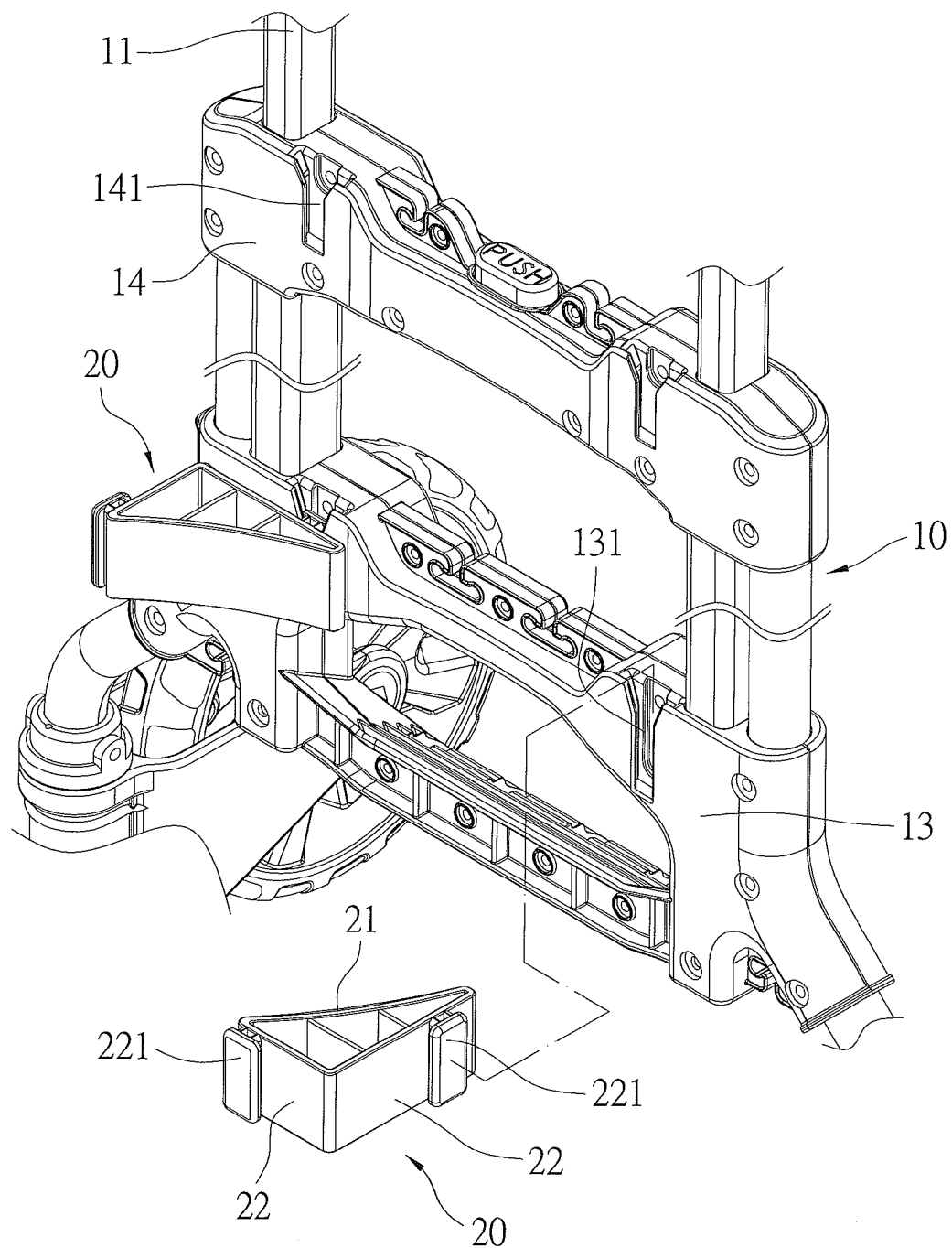
FIG. 2 is a perspective view showing the exploded components of the goods fixing structure for the trolley in accordance with the preferred embodiment of the present invention.

Referring to FIGS. 1 and 2, a goods fixing structure for a trolley 10 according to a preferred embodiment of the present invention comprises: two support columns 11, a connection mount 13, and at least two retainers 20.

A control bar 12 is disposed between two top ends of the two support columns 11.

The connection mount 13 is mounted between two bottom ends of the two support columns 11 and includes two locking recesses 131 defined on one side thereof, and a connector 14 is fixed between two middle sections of the two support columns 11. The connector 14 includes at least one pair of retaining slots 141 formed on one side surface thereof. The connection mount 13 also includes the at least two retainers 20 retained thereon. Each retainer 20 has an abutting face 21 and two contacting faces 22 and is formed in a right triangle block shape. The abutting face 21 is an arcuate surface, and the two contacting faces 22 are perpendicular to each other. A length of one of the two contacting faces 22 is more than the other of the two contacting faces 22. The abutting face 21 faces to a vertical connecting corner of the two contacting faces 22, and each contacting face 22 has an engaging rib 221 arranged thereon. Thus, each retainer 20 is connected with the connection mount 13 or the connector 14 by ways of the engaging rib 221 of each contacting face 22, thus assembling the goods fixing structure completely.

Figure 3:
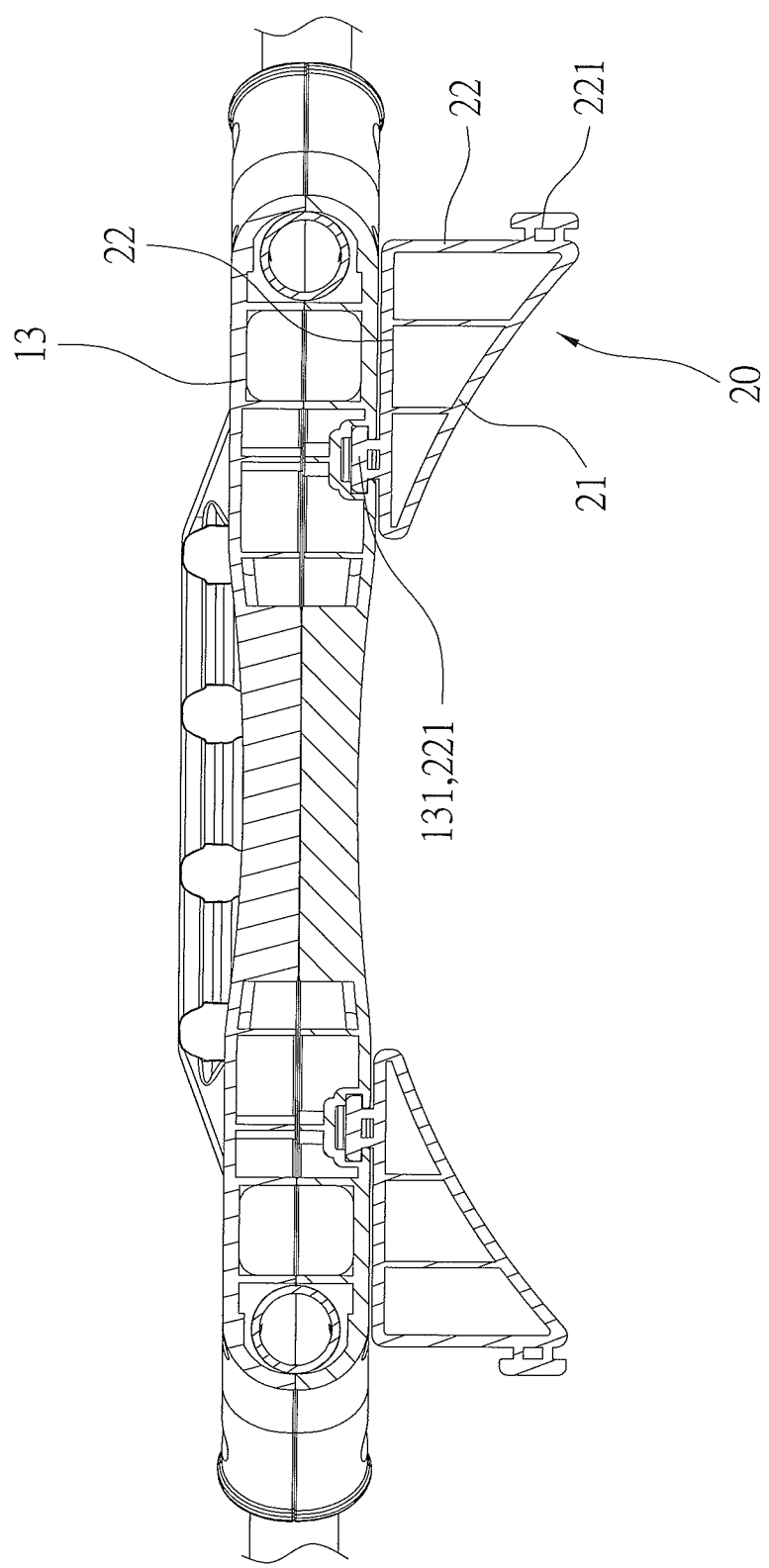
FIG. 3 is a cross sectional view showing the assembly of the goods fixing structure for the trolley in accordance with the preferred embodiment of the present invention.
Figure 4:
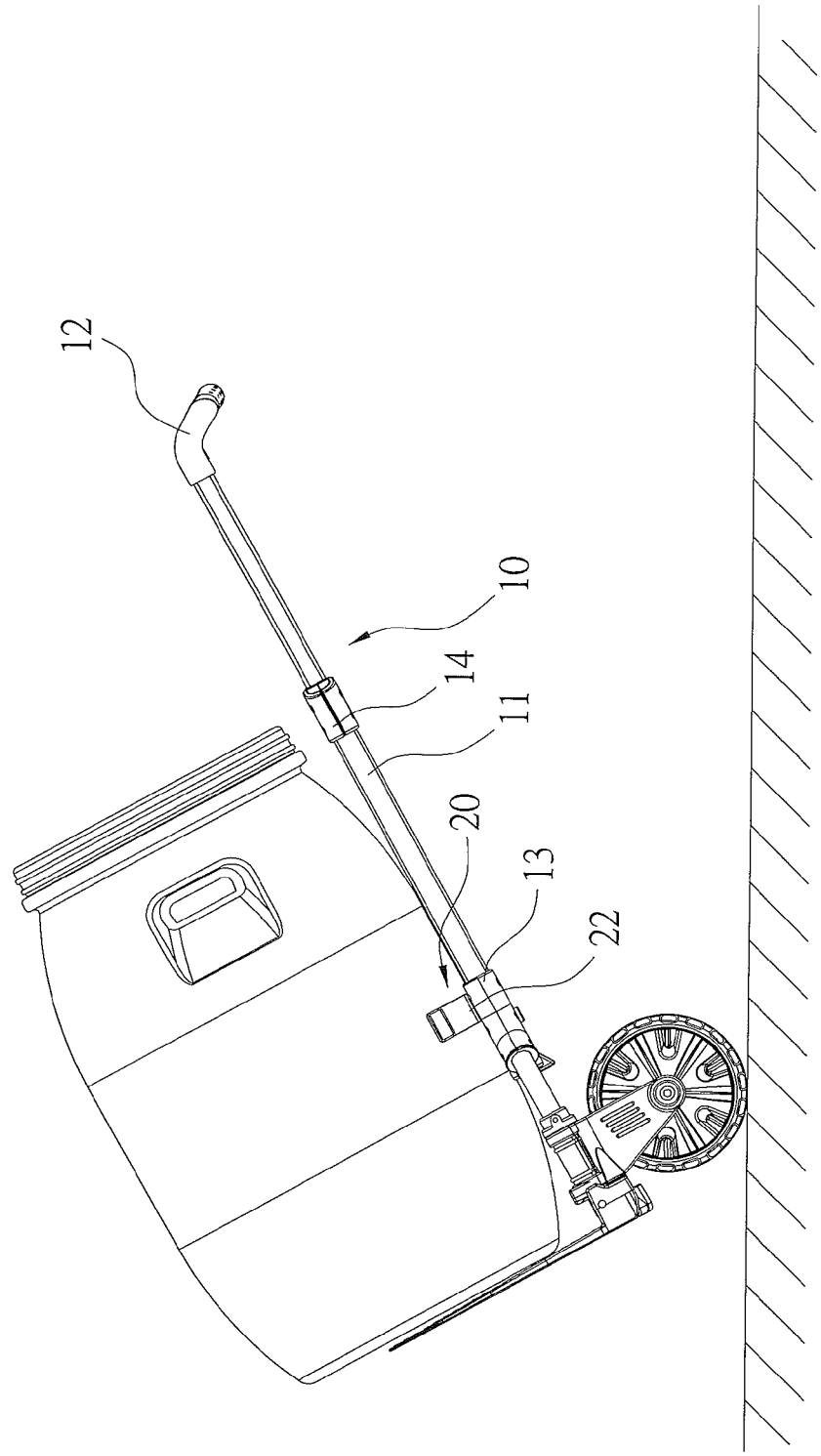
FIG. 4 is a side plan view showing the application of the goods fixing structure for the trolley in accordance with the preferred embodiment of the present invention.

In operation, as shown in FIGS. 1, 3 and 4, the engaging rib 221 of each contacting face 22 of each retainer 20 retains with one of the two locking recesses 131 of the connection mount 13, and two abutting faces 21 of the two retainers 20 face to each other. Thus, an arcuate limiting space is defined between the two retainers 20 to contact with outer walls of columnar or cylindrical goods, and the two retainers 20 position the columnar or cylindrical goods securely to avoid the goods dropping from the trolley 10.

Figure 5:
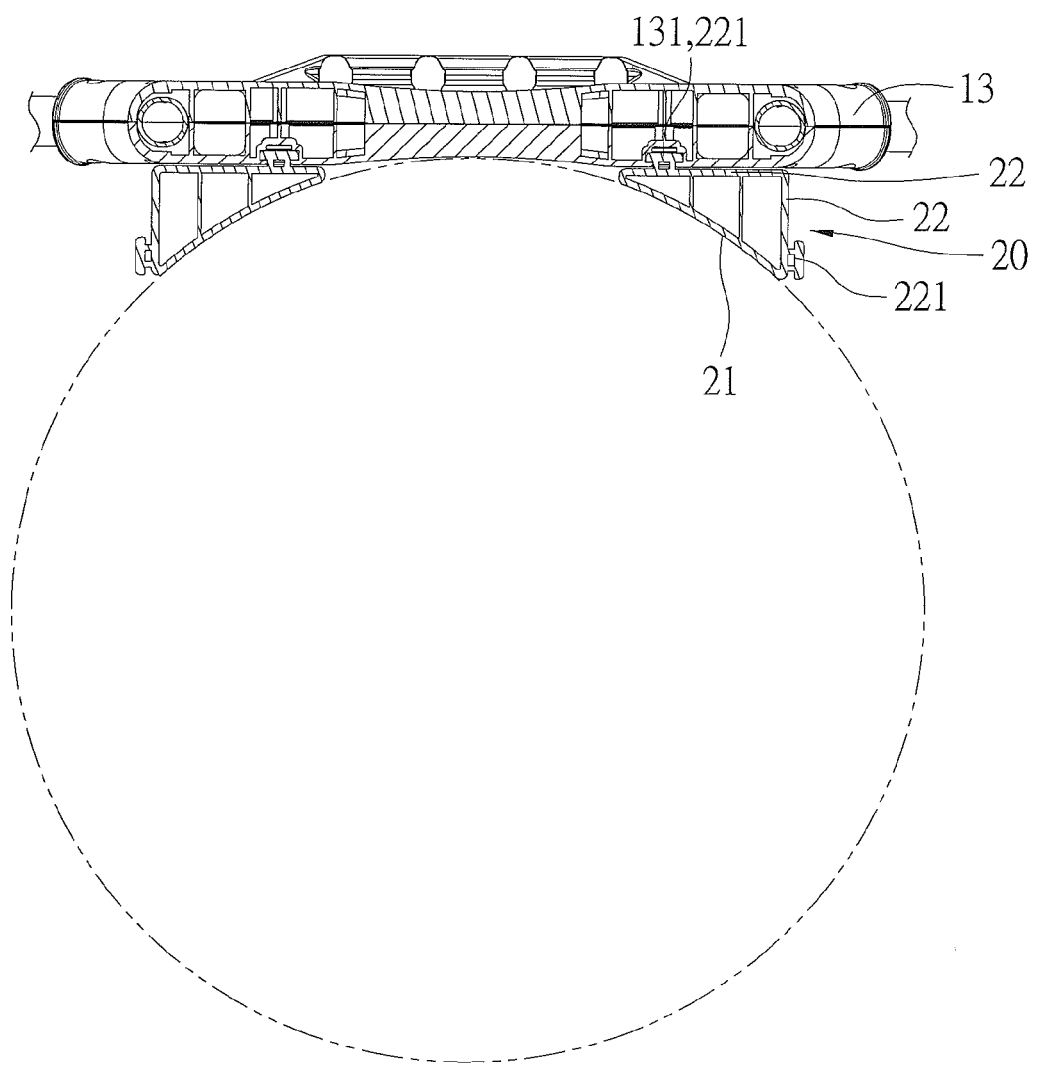
FIG. 5 is a cross sectional view showing the application of the goods fixing structure for the trolley in accordance with the preferred embodiment of the present invention.
Figure 6:
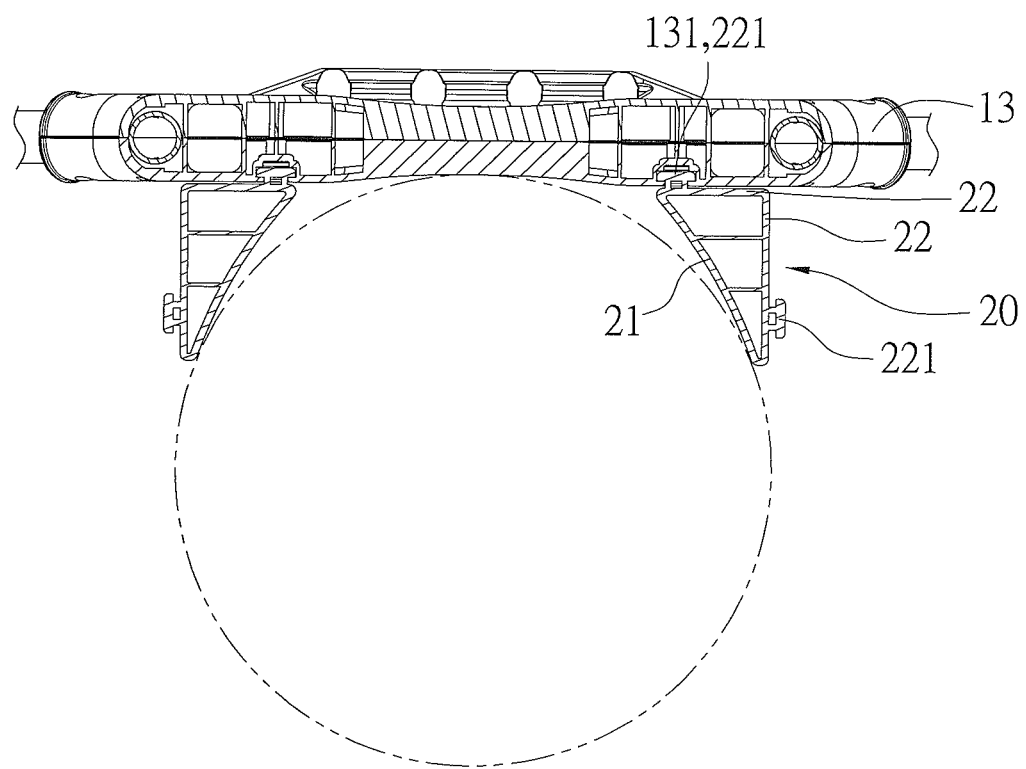
FIG. 6 is another cross sectional view showing the application of the goods fixing structure for the trolley in accordance with the preferred embodiment of the present invention.

Since the length of one of the two contacting faces 22 is more than the other of the two contacting faces 22, the two retainers 20 are changeably connected with the connection mount 13 or the connector 14 based on sizes of the goods. As illustrated in FIGS. 5 and 6, when one of the goods with a larger diameter is placed onto the trolley 10, one of the two contacting faces 22 with a longer length is connected with the connection mount 13 to increase a distance between the two retainers 20. Hence, a contact area of the two abutting faces 21 is wider to carry one of the goods with the larger diameter. When another of the goods with a smaller diameter is placed onto the trolley 10, the other of the two contacting faces 22 with a shorter length is connected with the connection mount 13 to decrease the distance between the two retainers 20. Hence, the contact area of the two abutting faces 21 is reduced to carry another of the goods with the smaller diameter. Thereby, the trolley 10 carries different goods securely and easily.

The goods fixing structure of the present invention contains benefits as follows:

1. The two retainers 20 are connected with the connection mount 13 of the trolley 10, and each retainer 20 has the abutting face 21. Thus, the two retainers 20 position the columnar or cylindrical goods stably while pushing the trolley 10, thus avoiding the goods dropping from the trolley 10.

2. Each retainer 20 has the two contacting faces 22, and lengths of the two connecting faces 22 are different. Thus, the two retainers 20 are connected with the trolley 10 by using the two contacting faces 22 of each retainer 20 to change the distance between the two retainers 20. Hence, the goods of different sizes are carried by the trolley 10 easily.

While various embodiments in accordance with the present invention have been shown and described, it is clear to those skilled in the art that further embodiments may be made without departing from the scope of the present invention.

What is claimed is:

1. A goods fixing structure for a trolley comprising:
   two support columns and a control bar disposed between two top ends of the two support columns;
   a connection mount mounted between two bottom ends of the two support columns and including two locking recesses defined on one side thereof and extending parallel to and spaced from the two support columns;
   at least two retainers, with each retainer having an abutting face and two contacting faces extending parallel to the two support columns, wherein each contacting face has an engaging rib arranged thereon and slideably received parallel to the two support columns in one of the two locking recesses to retain each retainer to the connection mount.

2. The goods fixing structure for a trolley as claimed in claim 1 further comprising a connector fixed between two middle sections of the two support columns intermediate and spaced from the two top and bottom ends, wherein the connector includes at least one pair of retaining slots formed on one side surface thereof and extending parallel to and spaced from the two support columns, with each engaging rib of each retainer slideably received parallel to the two support columns in one of the two retaining slots to retain each retainer to the connector.

3. The goods fixing structure for a trolley as claimed in claim 1, wherein the abutting face is an arcuate surface.

4. The goods fixing structure for a trolley as claimed in claim 1, wherein a length of one of the two contacting faces is more than the other of the two contacting faces.

5. A goods fixing structure for a trolley comprising:
   two support columns and a control bar disposed between two top ends of the two support columns;
   a connection mount mounted between two bottom ends of the two support columns and including two locking recesses defined on one side thereof;
   at least two retainers, with each retainer having an abutting face and two contacting faces, wherein each contacting face has an engaging rib arranged thereon to retain with one of the two locking recesses, wherein each retainer is formed in a right triangle block shape, wherein the two contacting faces are perpendicular to each other, and wherein the abutting face faces to a vertical connecting corner of the two contacting faces.

6. The goods fixing structure for a trolley as claimed in claim 5, wherein the abutting face is an arcuate surface.

7. The goods fixing structure for a trolley as claimed in claim 5, wherein a length of one of the two contacting faces is more than the other of the two contacting faces.

* * * * *